US009325667B2

(12) United States Patent  (10) Patent No.: US 9,325,667 B2
Pignataro et al.  (45) Date of Patent: Apr. 26, 2016

(54) INSTANT MESSAGING VIRTUAL PRIVATE NETWORKS

(71) Applicant: Cisco Technology, Inc., San Jose, CA (US)

(72) Inventors: Carlos M. Pignataro, Raleigh, NC (US); Gonzalo A. Salgueiro, Raleigh, NC (US); Joseph M. Clarke, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 99 days.

(21) Appl. No.: 13/630,143

(22) Filed: Sep. 28, 2012

(65) Prior Publication Data

US 2014/0096197 A1  Apr. 3, 2014

(51) Int. Cl.
*H04L 29/06* (2006.01)
*H04L 12/46* (2006.01)
*H04L 12/58* (2006.01)

(52) U.S. Cl.
CPC ........ *H04L 63/0272* (2013.01); *H04L 12/4641* (2013.01); *H04L 51/04* (2013.01)

(58) Field of Classification Search
None
See application file for complete search history.

(56) References Cited

U.S. PATENT DOCUMENTS

| | | | | |
|---|---|---|---|---|
| 6,452,915 B1* | 9/2002 | Jorgensen | ................. | H04L 1/20 370/328 |
| 7,103,772 B2* | 9/2006 | Jorgensen et al. | ............ | 713/168 |
| 7,321,969 B2* | 1/2008 | Schoen et al. | ................ | 713/153 |
| 8,976,798 B2* | 3/2015 | Border | ................ | H04L 12/4641 370/394 |
| 2002/0118671 A1* | 8/2002 | Staples | ............... | H04L 12/6418 370/352 |
| 2004/0128540 A1* | 7/2004 | Roskind | ......................... | 713/201 |
| 2005/0044503 A1* | 2/2005 | Richardson et al. | .......... | 715/753 |
| 2006/0236370 A1* | 10/2006 | John | ..................... | H04L 63/105 726/1 |
| 2007/0153798 A1* | 7/2007 | Krstulich | ...................... | 370/392 |
| 2008/0271137 A1* | 10/2008 | Sinn | ................................ | 726/15 |
| 2008/0275864 A1* | 11/2008 | Kim | .................. | G06F 17/30867 1/1 |
| 2009/0064304 A1* | 3/2009 | Cohen et al. | ..................... | 726/11 |
| 2010/0070962 A1* | 3/2010 | Sinn | ......................... | G06F 8/65 717/171 |
| 2010/0180037 A1* | 7/2010 | Dessart | ........................ | 709/227 |

(Continued)

OTHER PUBLICATIONS

Wippien—Free p2p VPN software; "Wippien is for;" http://www.wippien.com; printed Sep. 27, 2012; 3 pages.

(Continued)

*Primary Examiner* — Farid Homayounmehr
*Assistant Examiner* — Maung Lwin
(74) *Attorney, Agent, or Firm* — Baker Botts L.L.P.

(57) ABSTRACT

According to one embodiment, an apparatus receives a virtual private network (VPN) establishment request and a plurality of packets communicated over at least one first protocol, with the first protocol being at least one of the Session Initiation Protocol, the Open System for Communication in Realtime protocol, and the Extended Messaging and Presence Protocol. The apparatus prioritizes the VPN establishment request over the plurality of packets and communicates a negotiation packet comprising a destination port and a response port. The apparatus receives, over a second communication protocol, a datagram through a communication tunnel established in response to receiving the negotiation packet, wherein the datagram is associated with a payload type, the datagram comprises an encapsulation envelope indicating the payload type, the datagram is received at the destination port, a response to the datagram is communicated to the response port, and the second communication protocol is different from the first protocol.

12 Claims, 4 Drawing Sheets

(56) References Cited

U.S. PATENT DOCUMENTS

| | | | |
|---|---|---|---|
| 2010/0281251 A1* | 11/2010 | Arauz Rosado | 713/152 |
| 2011/0138458 A1* | 6/2011 | Kumar et al. | 726/15 |
| 2011/0145426 A1* | 6/2011 | Miyajima | H04L 63/0272 709/230 |
| 2012/0117381 A1* | 5/2012 | Lo | G06F 8/63 713/156 |

OTHER PUBLICATIONS

PCT Notftication of Transmittal of the International Search Report and the Written Opinion of the International Searching Authority, or the Declaration, International application No. PCT/US2013/060265.

* cited by examiner

INSTANT MESSAGING VIRTUAL PRIVATE NETWORKS

TECHNICAL FIELD

This disclosure relates generally to electronic communications through virtual private networks.

BACKGROUND

As telecommunications and network technologies have advanced, so has the desire to access resources through virtual private networks. However, technical challenges associated with end devices, communication networks, bandwidth, and computation resources impede the adoption and use of virtual private networks.

SUMMARY OF THE DISCLOSURE

According to one embodiment, an apparatus may receive a virtual private network (VPN) establishment request communicated over an instant messenger protocol. The apparatus may negotiate a communication tunnel in response to receiving the VPN establishment request and receive a datagram through the communication tunnel.

According to another embodiment, one or more computer-readable non-transitory storage media may embody software that is operable when executed to communicate a VPN establishment request over an instant messaging protocol. The software may be further operable when executed to negotiate a communication tunnel after the VPN establishment request is received and communicate a datagram through the communication tunnel.

Certain embodiments may provide one or more technical advantages. A technical advantage of one embodiment includes more efficient usage of network bandwidth. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

This disclosure describes a system for establishing a virtual private network using an instant messaging protocol. A user may use the virtual private network to access network resources from sites that are external to a network hosting those resources. For example, the user may wish to access, from a home network, programs and files that are stored on a work network. The user may use a device such as a personal computer, laptop, tablet, or smart phone to establish a virtual private network with the work network. The user may then access the programs and files stored in the work network.

The user may use an instant messaging application on the device to establish the virtual private network. The application may present a buddy list to the user. The user may use the application to send a buddy request to a device associated with the work network such as, for example, a router. The router may confirm or reject the buddy request based on the credentials of the user. If the router accepts the buddy request, the application may include the router in the user's buddy list. The user may then request to establish a VPN with the router by using the instant messaging application. For example, the user may select the router on the buddy list and select an option to establish a VPN with the router.

The application may send a VPN establishment request to the router. The router may confirm whether the user is authorized to establish a VPN with the router. If the user is authorized to establish a VPN with the router, the router and the application may begin negotiating a VPN connection. After the connection is established, the user may use the VPN connection to access the programs and files stored on the work network.

In particular embodiments, using the system to establish a VPN over an instant messaging protocol may improve network efficiency by reducing the amount of network traffic associated with establishing the VPN. In other embodiments, by establishing a VPN using an instant messaging protocol, the system may make available parts of a network that traditional VPNs do not have access to based on network address translation traversal mechanisms.

Figure 1:
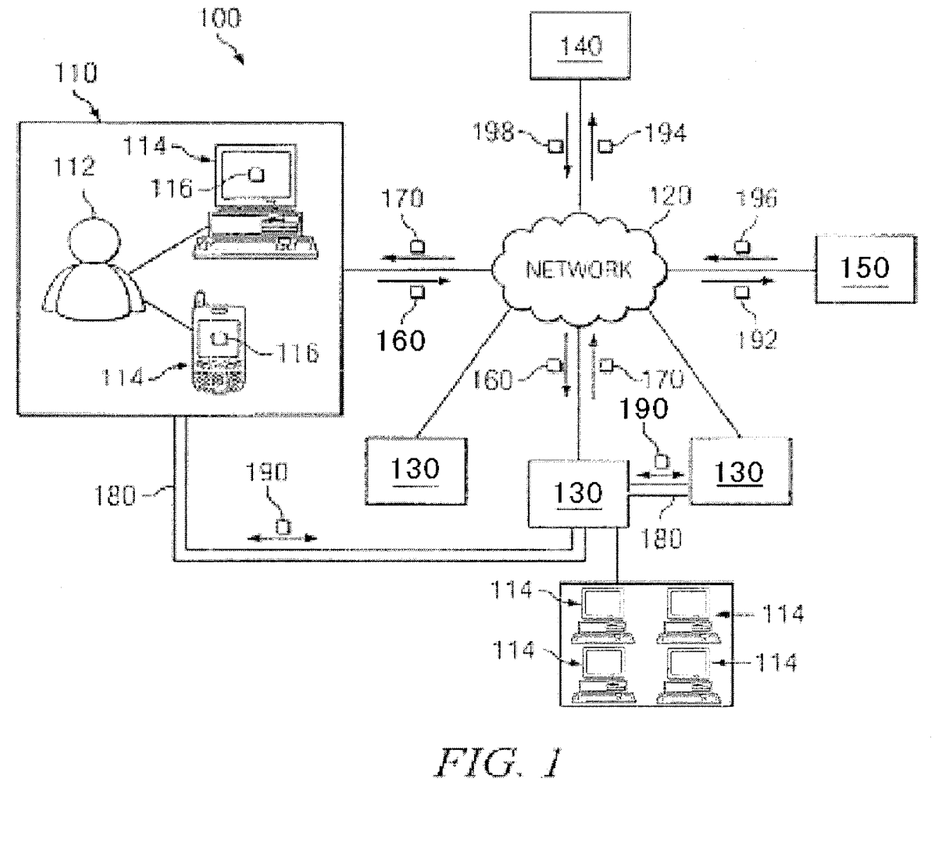
FIG. 1 illustrates a system for establishing a virtual private network using an instant messaging protocol.
Figure 2:
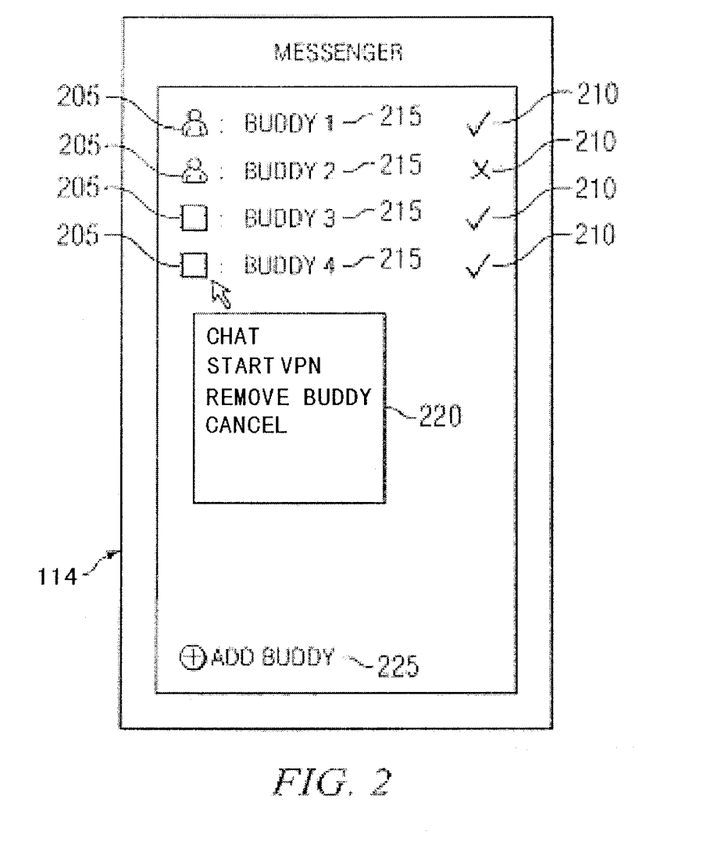
FIG. 2 illustrates a device of the system of FIG. 1 capable of establishing a virtual private network using an instant messaging protocol.
Figure 3:
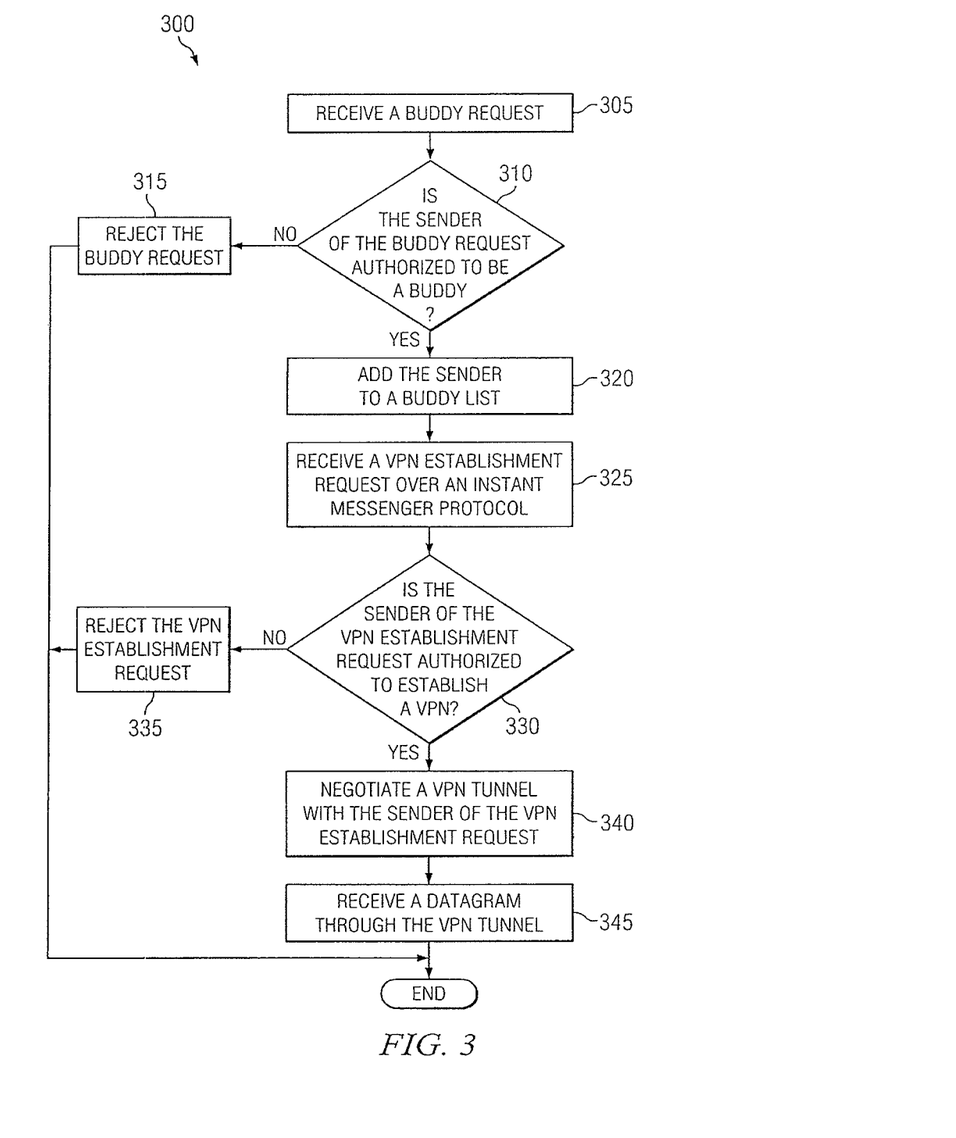
FIG. 3 is a flowchart illustrating a method of establishing a virtual private network using an instant messaging protocol.
Figure 4:
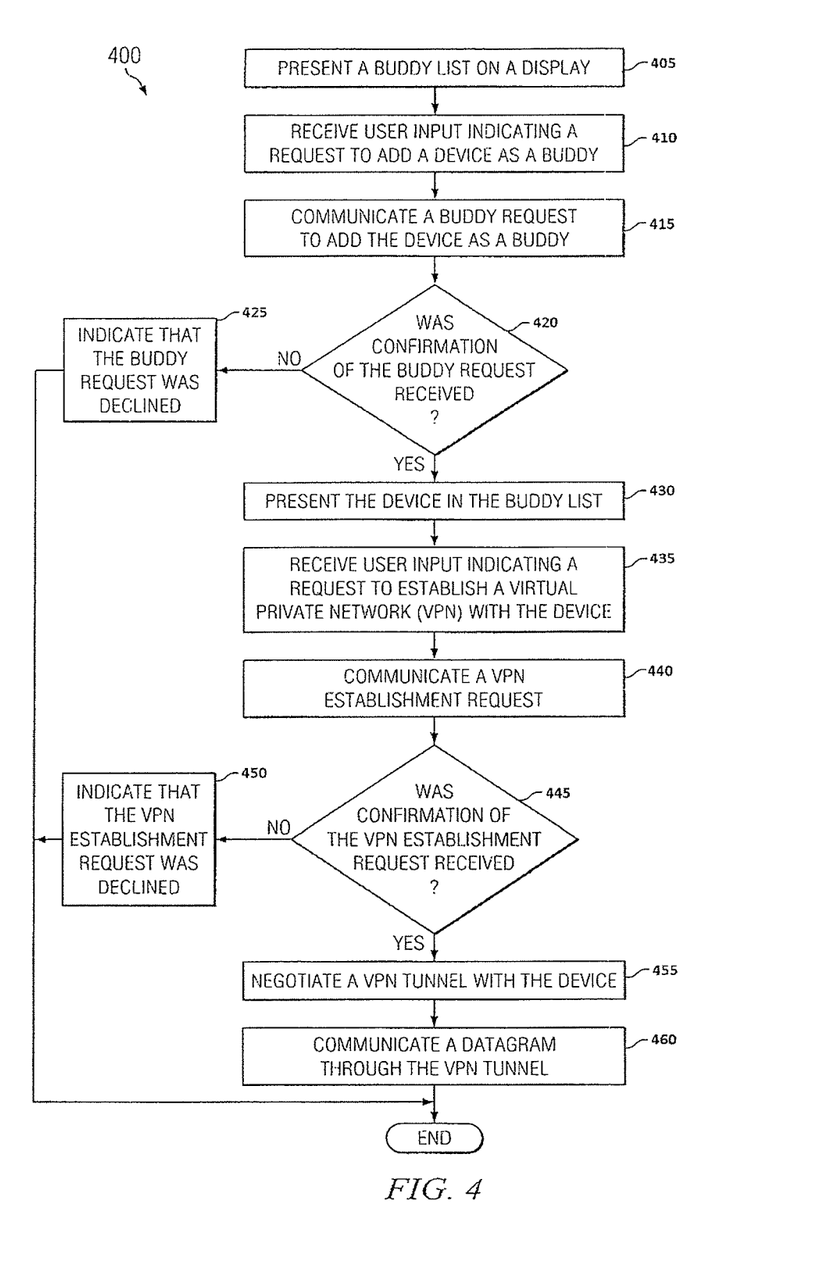
FIG. 4 is a flowchart illustrating a method of establishing a virtual private network using an instant messaging protocol.

FIG. 1 illustrates the system that allows the user to establish a VPN over an instant messaging protocol. FIG. 2 illustrates an instant messaging application that the user may use to establish a VPN over an instant messaging protocol. FIGS. 3 and 4 include flowcharts that illustrate a method that elements of the system of FIG. 1 may perform to establish a VPN over an instant messaging protocol.

FIG. 1 illustrates a system 100 for establishing a virtual private network (VPN) using an instant messaging protocol. System 100 may include a user environment 110, network devices 130, and servers 140 and 150 communicatively coupled to network 120. User 112 may use system 100 to establish a VPN between user environment 110 and a network device 130 over an instant messaging protocol.

System 100 includes user environment 110. A user 112 may be in user environment 110 and may desire to establish a VPN with a remote network device 130. For example, user 112 may be at a home office and may wish to use a device 114 in the home office to establish a VPN with a router at work in order to access work resources such as email and/or word processing. User environment 110 may be an office, a car, or any other suitable setting in which user 112 can establish a VPN over an instant messaging protocol.

User environment 110 may include a device 114. User 112 may use device 114 to establish a VPN with network device 130. Device 114 may be a mobile device such as a cell phone or tablet. Device 114 may be a personal computer, a workstation, a laptop, a wireless or cellular telephone, an electronic notebook, a personal digital assistant, a tablet, or any other device (wireless, wireline, or otherwise) capable of receiving, processing, storing, and/or communicating information with other components of system 100. Device 114 may also include a user interface, such as a display, a touchscreen, a microphone, keypad, or other appropriate terminal equipment usable by user 112.

In particular embodiments, device 114 may include a processor and a memory. The memory may store an application 116 comprising lines of code executable by the processor. When executed, application 116 may aid user 112 in establishing a VPN with network device 130 over an instant messaging protocol. For example, application 116 may be an instant messaging client that has been designed to request and negotiate a VPN with network device 130. For example, application 116 may present, on a display of device 114, a buddy list associated with user 112. The network device 130 may be included in that buddy list. User 112 may request to establish a VPN with the network device 130 by making a selection associated with the buddy list. For example, user 112 may right click on the buddy corresponding to the network device 130 and select an option to establish a VPN.

User environment 110 may be communicatively coupled to network 120. Network 120 may be configured to route network traffic to and from user environment 110, network device 130, and servers 140 and 150. This disclosure contemplates any suitable network 120 operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

System 100 includes network devices 130. System 100 may establish a VPN between devices 114 and network devices 130. Network devices 130 may then provide access to network resources through the established VPN. Network device 130 may be any suitable device operable to establish a VPN over an instant messaging protocol, such as a router, a switch, a server, or any other suitable network device 130. For example, network device 130 may be a router in an office network that includes several devices 114. User 112 may establish a VPN with the office router in order to access resources hosted on these devices 114 such as, for example, email and/or word processing.

System 100 includes servers 140 and 150. Servers 140 and 150 may include one or more processors and memories that perform that functions described herein. In particular embodiments, server 150 may track and maintain instant messaging information. For example, server 150 may store the network addresses of devices 114 and network devices 130. Server 150 may further track whether devices 114 and network devices 130 are operable to establish a VPN over an instant messaging protocol. For example, if user 112 may use a device 114 to establish a VPN with an office router, then server 150 may store information regarding the office router. For example, server 150 may store the IP address of the office router and indicate that the office router is operable to establish a VPN over an instant messaging protocol. In particular embodiments, a device 114 may communicate with server 150 in order to determine whether a network device 130 is operable to establish a VPN over an instant messaging protocol.

Server 150 may further process instant messaging chats sent from device 114. For example, user 112 may use device 114 and application 116 to chat with a buddy. The chat may be sent as a packet to server 150, and server 150 may handle and route the packet to the buddy. In particular embodiments, server 150 may prioritize packets associated with VPN over packets associated with a chat. For example, server 150 may send a packet confirming that a particular network device 130 is operable to establish a VPN over an instant messaging protocol before server 150 communicates a packet associated with a chat. Received packets may include a packet type field that tells server 150 whether the received packet includes a chat message or a packet associated with a VPN. Server 150 may examine the type field to determine how to prioritize the packet. In this manner, server 150 may improve the efficiency of system 100 by allowing processor-intensive operations such as starting and maintaining a VPN session to begin processing before other processes such as a chat.

Server 140 may perform authentication and authorization functions in particular embodiments. Server 140 may authenticate user 112 and determine whether user 112 is authorized to perform particular functions in system 100. For example, server 140 may determine whether user 112 is authorized to establish a VPN with network device 130. As another example, server 140 may determine whether user 112 is authorized to add a network device 130 as a buddy. If server 140 determines that user 112 is not authorized to perform a particular function or action, server 140 may communicate a packet to prevent user 112 from performing that action. For example, server 140 may communicate the packet to server 150 and server 150 may prevent user 112 from performing that action. As an example, if user 112 attempts to establish a VPN with a network device 130, server 150 may send a request to server 140 to determine whether user 112 is authorized to establish a VPN with the network device 130. Server 140 may determine that user 112 is not authorized to establish a VPN with the network device 130 and communicate a packet to server 150 to indicate this. In response to receiving the packet, server 150 may prevent user 112 from establishing a VPN with the network device 130. This disclosure contemplates server 140 communicating packets to any appropriate element of system 100. For example, server 140 may communicate the packet to network device 130, and network device 130 may prevent user 1123 from establishing a VPN.

In operation, system 100 allows user 112 to establish a VPN over an instant messaging protocol. User 112 may use application 116 executing on a device 114 to request a VPN with a network device 130. For example, use 112 may use a home computer to request a VPN with an office router. Device 114 may communicate an establishment request 160 in order to begin the process of establishing a VPN with network device 130.

In particular embodiments, the establishment request 160 may be communicated to network device 130. The establishment request 160 may include a user name of user 112 and an IP address of the device 114. By examining the establishment request 160, the network device 130 may determine which user 112 and device 114 have requested to establish a VPN with the network device 130. The network device 130 may then determine that the user 112 and the device 114 may establish a VPN with the network device 130 by, for example, examining a list of authorized users or by communicating with servers 140 and 150. In response to that determination, network device 130 may communicate a negotiation packet 170.

Device 114 may receive the negotiation packet 170. The negotiation packet 170 may include an IP address and port numbers associated with the network device 130 and device 114. Device 114 may use the IP address and port included in the negotiation packet 170 to begin negotiating a VPN with the network device 130. For example, the negotiation packet 170 may indicate a port number for device 114 to open in order to establish a VPN with network device 130. Device 114 may open that port and begin monitoring it for communications from network device 130. As another example, the negotiation packet 170 may indicate a port number that the network device 130 has opened in order to communicate with device 114. Device 114 may begin sending packets to that port.

After receiving negotiation packet 170, device 114 may begin negotiating a communication tunnel between device 114 and network device 130. The process of negotiating communication tunnel 180 may include opening and monitoring particular port numbers specified by the negotiation packet 170. Negotiating the communication tunnel 180 may also include a handshake protocol. After device 114 and network device 130 have established communication tunnel 180, device 114 and network device 130 may begin communicating datagrams 190 to each other over the communication tunnel 180. Datagrams 190 may include information associated with network resources hosted on devices 114 that are communicatively coupled to network device 130. For example, device 114 may have established a communication tunnel 180 with an office router. The office router may begin communicating datagrams 190 associated with office network resources such as, for example, email and/or word processing. The office router and device 114 may communicate the datagrams 190 over the instant messaging protocol used to establish the VPN.

In some embodiments, system 100 may establish a VPN over an instant messaging protocol without user interaction and/or input. For example, network device 130 may request a VPN with another network device 130 without user 112 requesting the VPN. Network device 130 may request a VPN with another network device 130 over an instant messaging protocol in the manner described herein. After negotiating a communication tunnel 180, network device 130 may communicate datagrams 190 to the other network device 130 through the communication tunnel 180, and vice versa. In this manner, system 100 may establish device-to-device or machine-to-machine VPNs without input from user 112.

Datagrams 190 may be encapsulated based on the protocols used during the transport of the datagrams 190. For example, a datagram 190 may be encapsulated in an XMPP envelope and a point-to-point protocol (PPP) envelope. The XMPP envelope may allow the datagram 190 to be transported over the XMPP protocol. The PPP envelope may associate the datagram 190 with a payload type. For example, the PPP envelope may include an identification field that identifies the payload of the datagram 190 as being an Internet Protocol (IP) or Internetwork Packet Exchange (IPX) packet. In this manner, any suitable type of payload and/or datagram 190 may be communicated through communication tunnel 180, and a flexible foundation of VPNs may be established to any number of suitable elements. Furthermore, the VPNs may benefit from the security and encryption features of the transport protocol even though the underlying payload of datagram 190 may not be of a type associated with the transport protocol. This disclosure contemplates datagram 190 containing a payload of any suitable type. This disclosure further contemplates datagram 190 being encapsulated in any suitable envelopes. For example, datagram 190 may be encapsulated in envelopes associated with encryption and security.

Particular layers of encapsulation may be removed from datagram 190 in certain embodiments. As an example, datagrams 190 may be communicated using the user datagram protocol or the transmission control protocol. Datagram 190 may be associated with a destination port and a response port. When device 114 and/or network device 130 receives datagram 190, device 114 and/or network device 130 may forward datagram 190 to the destination port and communicate any responses to the response port. An application executing on device 114 and/or network device 130 may expect to receive datagram 190 at the destination port regardless of the payload type associated with datagram 190. For at least this reason, an encapsulation envelope that identifies the payload type of datagram 190 may be removed. In this manner, overhead associated with communicating datagrams 190 may be removed and the communication of datagrams 190 may not consume as much network bandwidth.

The datagrams 190 may be communicated over a protocol other than the instant messaging protocol used to establish the VPN. For example, the datagrams 190 may be communicated out-of-band over a User Datagram Protocol or any other suitable data protocol. In this manner, system 100 may use an instant messaging protocol to establish a VPN, but use a more robust data transfer protocol to transport datagrams 190.

In particular embodiments, user 112 may use device 114 to request a VPN with network device 130 over an instant messaging protocol. Specifically, the establishment request 160 and the negotiation packet 170 may be communicated over an instant messaging protocol such as, for example, the Extensible Messaging and Presence Protocol (XMPP). This disclosure contemplates communications over any suitable instant messaging protocol such as, for example, OSCAR and SIP. User 112 may use an application 116 that communicates over these protocols in order to establish a VPN with network device 130.

In particular embodiments, servers 140 and 150 may determine whether user 112 may perform particular actions such as, for example, adding network device 130 as a buddy and establishing a VPN with network device 130. When user 112 makes a request or initiates an action with network device 130, server 150 may receive a request packet 192. For example, when user 112 requests to add network device 130 as a buddy, server 150 may receive request packet 192. The request packet 192 may indicate a user name associated with user 112, a name and IP address associated with network device 130, and a request type that indicates that user 112 is requesting to add network device 130 as a buddy. Server 150 may examine request packet 192 and determine whether user 112 is authorized to add network device 130 as a buddy. After server 150 makes a determination, server 150 may communicate a response packet 196 to allow or deny user 112 from adding network device 130 as a buddy. As another example, user 112 may request to establish a VPN with network device 130. Again, server 150 may receive a request packet 192 with a request type that indicates that user 112 is requesting to establish a VPN with network device 130. After determining whether user 112 is allowed to establish a VPN with network device 130, server 150 communicates a response packet 196 to facilitate or deny the establishment of a VPN.

Server 140 may aid server 150 in determining whether user 112 is authorized to perform particular actions. For example, server 150 may communicate an authorization request 194 to server 140. When user 112 requests to perform a particular action. The authorization request may include a user name associated with user 112, an IP address and device name associated with network 130, and a request type. Server 140 may examine authorization request 194 to determine whether user 112 is authorized to perform an action of the indicated request type on network device 130. For example, server 140 may maintain a table of actions that user 112 is authorized to perform. The table may indicate that user 112 is authorized to establish a VPN with network device 130. When server 140 receives an authorization request 194 that indicates user 112 is requesting to establish a VPN with network device 130, server 140 may examine the table to determine that user 112 should be allowed to establish the VPN with network device 130.

Server 140 may then communicate an authorization response 198 that indicates whether user 112 is authorized to perform the requested action. In particular embodiments, server 140 may communicate authorization response 198 to server 150. Server 150 may use authorization response 198 to determine what information should be included in response packet 196. For example, if server 140 determines that user 112 is authorized to establish a VPN with network device 130, server 140 may indicate in the authorization response 198 that the user 112 may establish a VPN with network device 130. Server 140 may then communicate the authorization response 198 to network device 130 and/or server 150 so that device 114 and network device 130 may begin establishing a VPN.

In particular embodiments, system 100 may provide more efficient usage of network bandwidth because system 100 allows user 112 to establish a VPN with network device 130 over an instant messaging protocol. System 100 may alleviate network stress by avoiding authentication and web interfaces associated with more traditional VPNs. System 100 may also remove technical challenges associated with traditional VPNs by allowing user 112 to establish VPNs via an instant messaging client that is more commonly used by user 112.

FIG. 2 illustrates a device 114 of the system 100 of FIG. 1 capable of establishing a virtual private network using an instant messaging protocol. User 112 may use device 114 to establish a VPN with a network device 130. Device 114 may execute an application 116 such as, for example, an instant messaging application as illustrated in the example of FIG. 2. The instant messaging application may provide an interface through which user 112 may establish a VPN with network device 130.

Although FIG. 2 illustrates device 114 presenting a graphical user interface, this disclosure contemplates system 100 establishing a VPN over an instant messaging protocol without a graphical user interface or user interaction. For example, network router 130 may establish a device-to-device VPN and/or a machine-to-machine VPN. As another example, system 100 may establish a VPN over an instant messaging protocol without user 112 interacting with a graphical user interface. As yet another example, system 100 may establish a VPN over an instant messaging protocol without any user interaction and/or input.

When executed, the instant messaging application may present on the display of device 114 a list of buddies. Each buddy is associated with a name 215 that identifies the buddy to the user 112. Each buddy is also associated with a presence status 210 that indicates the availability of that buddy to user 112. For example, Buddy 1 has a presence status 210 indicator of a checkmark indicating that Buddy 1 is available. When user 112 attempts to chat with Buddy 1, the instant messaging application may allow user 112 to chat normally with Buddy 1. However, Buddy 2 has a presence status 210 indicator of an X indicating that Buddy 2 is unavailable. When user 112 attempts to chat with Buddy 2, a message may be presented warning user 112 that Buddy 2 is not available to chat.

Each buddy is further associated with a buddy type 205. For example, Buddy 1 has a buddy type 205 that indicates that Buddy 1 is a human. However, Buddy 3 has a buddy type 205 that indicates that Buddy 3 is a device such as network device 130. When user 112 chats with a buddy, user 112 may expect different responses based on the buddy type 205. For example, when user 112 chats with a device, user 112 may expect automated or mechanical responses. However, when user 112 chats with a human, user 112 may expect more personal messages.

The instant messaging application may present on an area of the display of device 114 an add buddy indicator 225. User 112 may select the add buddy indicator 225 to add a buddy to the buddy list. User 112 may select the add buddy indicator 225 by performing actions such as clicking on the add buddy indicator 225 with a mouse or by touching a portion of a touchscreen associated with the add buddy indicator 225. After user 112 selects the add buddy indicator 225, the instant messaging application may request user 112 to input the name of the buddy that user 112 wishes to add. The instant messaging application may then communicate an add buddy request to an element of system 100 such as, for example, network device 130 and/or servers 140 and 150.

The element of system 100 may determine whether the add buddy request is valid and whether user 112 is authorized to add the designated buddy. For example, server 150 may determine whether the name of the buddy inputted by user 112 is a valid buddy name and server 140 may determine whether user 112 is authorized to add that particular buddy. As another example, network device 130 may receive the buddy request and may determine whether user 112 is authorized to add the network device 130 as a buddy. The element of system 100 may examine a list or table of users who are authorized to add network device 130 as a buddy to determine whether user 112 is authorized to be a buddy. If user 112 is on that list, then network device 130 may accept the buddy request.

If the element of system 100 determines that the user 112 is authorized to be a buddy, the element may further determine whether the user 112 is authorized to establish a VPN with the network device 130. The element of system 100 may examine a table or list of users who are authorized to establish a VPN with network device 130 to make this determination. In this manner, the element of system 100 may determine whether user 112 is authorized to establish a VPN in response to receiving the buddy request.

In particular embodiments, the buddy that user 112 requested to add may receive an add buddy confirmation message indicating that user 112 has requested to add the buddy. In response to receiving the message, the buddy may accept or reject the buddy request. If the buddy request is invalid or rejected or if user 112 is not authorized to add the buddy, then the instant messaging application may not add the new buddy to the buddy list. However, if the buddy request is accepted and valid and user 112 is authorized to add the buddy, then the instant messaging application may update the buddy list to include the new buddy.

When user 112 selects a particular buddy, the instant messaging application may present a list of actions 220 that user 112 may perform. Examples of these actions may include chatting, removing a buddy, and starting a VPN. When user 112 selects one of these actions 220, the instant messaging application may communicate packets associated with the selected action over an instant messaging protocol. For example, when user 112 sends a chat to a buddy the instant messaging application may communicate a packet that includes the chat message over an instant messaging protocol. Furthermore, when user 112 selects to start a VPN with a buddy, the instant messaging application may communicate an establishment request 160 over an instant messaging protocol. In the example illustrated in FIG. 2, user 112 may select the start VPN action 220 to request a VPN session with Buddy 4. The instant messaging application may then communicate an establishment request 160 over an instant messaging protocol. A VPN session may then be established between device 114 and the device associated with the name Buddy 4. During the VPN session, the device 114 may communicate datagrams through a communication tunnel associated with the VPN session.

In particular embodiments, the instant messaging application may alleviate network load and/or improve network efficiency by allowing the user 112 to establish VPNs without navigating through authentication and other web interfaces associated with traditional VPN services. In other embodiments, the instant messaging application may remove technical challenges associated with establishing VPNs by allowing user 112 to use a familiar interface to establish the VPNs. In further embodiments, the instant messaging application may provide better security and scalability as compared to traditional VPN services because the VPN packets are sent over an instant messaging protocol. For example, the instant messaging application may communicate VPN packets over XMPP, which would allow the VPN packets to take advantage of XMPP's security and also would allow VPNs to be established regardless of Network Address Translation boundaries.

FIG. 3 is a flowchart illustrating a method 300 of establishing a virtual private network using an instant messaging protocol. Network device 130 of system 100 may perform method 300. However, this disclosure also contemplates any element of system 100 such as servers 140 and 150 performing a portion of method 300. By performing method 300, network device 130 may maintain a buddy list of users and may determine which users are authorized to establish a VPN with network device 130. Network device 130 may then establish a VPN with authorized users at their request.

In step 305, network device 130 may receive a buddy request. The buddy request may include a name associated with user 112, an identifier, such as an IP address, associated with device 114, and a request type indicating that the request is a buddy request. In step 310, network device 130 may determine whether the sender of the buddy request, such as for example user 112, is authorized to be a buddy. Network device 130 may examine a list or table of authorized users to make this determination. In particular embodiments, network device 130 may communicate with servers 140 and 150 to determine whether user 112 is authorized to be a buddy. If user 112 is not authorized to be a buddy, then network device 130 may reject the buddy request in step 315. If user 112 is authorized to be a buddy, then network device 130 may add user 112 to a buddy list in step 320.

In step 325, network device 130 may receive a VPN establishment request over an instant messenger protocol. The VPN establishment request may include a name associated with the sender of the request, an IP address associated with a device that sent the request, and a request type indicating that the request is a VPN establishment request. In step 330, network device 130 determines whether the sender of the VPN establishment request is authorized to establish a VPN with network device 130. Network device 130 may make this determination by examining the name and IP address included in the VPN establishment request. In particular embodiments, network device 130 may communicate with servers 140 and 150 to make this determination. If the sender is not authorized to establish a VPN, then network device 130 may reject the VPN establishment request in step 335.

If the sender is authorized to establish a VPN, network device 130 may negotiate a VPN tunnel with the sender of the VPN establishment request in step 340. This negotiation may include the opening and monitoring of ports on both the network device 130 and the device that sent the VPN establishment request. For example, the network device 130 may open port 23 and instruct the device to open port 2323. In response, the device may open its port 2323 and communicate packets to port 23 on the network device 130. After the VPN tunnel has been established, network device 130 may receive a datagram through the VPN tunnel in step 345.

FIG. 4 is a flowchart illustrating a method 400 of establishing a virtual private network using an instant messaging protocol. Device 114 or system 100 may perform method 400. In particular embodiments, device 114 may execute an application 116, such as an instant messaging application, to perform method 400. By performing method 400, device 114 may maintain a buddy list that includes network devices and allow a user 112 to request to establish VPNs with those devices.

In step 405, device 114 may present a buddy list on a display. In step 410, device 114 may receive user input indicating a request to add a device such as network device 130 as a buddy. In step 415, the device may communicate a buddy request to add the network device 130 as a buddy. The buddy request may be invalid or the user 112 that sent the buddy request may not be authorized to add the network device 130 as a buddy. If the request was valid and the user 112 is authorized to add the network device 130 as a buddy, then device 114 should receive a confirmation to the buddy request. In step 420, the device 114 determines whether confirmation of the buddy request was received. If confirmation was not received, device 114 may indicate that the buddy request was declined or invalid in step 425.

If confirmation was received, device 114 may continue to step 430 to present the network device 130 in the buddy list. After the network device 130 appears in the buddy list, user 112 may select the network device 130 on the buddy list and request to establish a VPN with the network device 130. In step 435, device 114 may receive user input indicating a request to establish a VPN with the network device 130. In response to receiving the user input, device 114 may communicate a VPN establishment request in step 440. The VPN establishment request may be communicated over an instant messaging protocol. In particular embodiments, the sender of the VPN establishment request such as, for example, user 112 may not be authorized to establish a VPN with network device 130. If user 112 is authorized to establish a VPN with network device 130, then device 114 should receive confirmation of the VPN establishment request, such as for example a negotiation packet. In step 445, device 114 may determine whether confirmation of the VPN establishment request was received. If confirmation was not received, device 114 may indicate that the VPN establishment request was declined in step 450.

If confirmation of the VPN establishment request was received, device 114 may begin negotiating a VPN tunnel with the network device 130 in step 455. In particular embodiments, the negotiation may include the opening and monitoring of ports on device 114 and the network device 130 and/or the performance of a handshake protocol between device 114 and network device 130. After the VPN tunnel has been established, device 114 may communicate a datagram through the VPN tunnel in step 460. The datagram may be communicated over the instant messaging protocol or another data transport protocol.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus operable to:
receive a virtual private network (VPN) establishment request communicated over at least one first protocol, and also receive a plurality of packets not associated with the VPN establishment request,
the at least one first protocol being at least one of the Session Initiation Protocol, the Open System for Communication in Realtime protocol, and the Extended Messaging and Presence Protocol;
communicate a confirmation packet indicating that the VPN establishment request is authorized,
wherein the confirmation packet is prioritized to have a higher priority than the priority of the plurality of packets by distinguishing the confirmation packet from the plurality of packets,
the distinguishing including examining a type field of the confirmation packet,
the confirmation packet also including a negotiation packet using the at least one first protocol, the negotiation packet comprising:
a destination port; and
a response port; and
receive, over a second communication protocol, a datagram through a communication tunnel established in response to receiving the negotiation packet, wherein:
the datagram is associated with a payload type;
the datagram comprises an encapsulation envelope that indicates the payload type;
the datagram is received at the destination port;
a response to the datagram is communicated to the response port; and
the second communication protocol is different from the at least one first protocol.

2. The apparatus of claim 1 further operable to determine that at least one of a user and a device associated with the VPN establishment request is authorized to establish the communication tunnel prior to negotiating the communication tunnel.

3. The apparatus of claim 1 further operable to:
receive a buddy request sent over the at least one first protocol; and
designate at least one of a user and a device associated with the buddy request as a buddy capable of establishing a VPN with the apparatus in response to receiving the buddy request.

4. The apparatus of claim 3 further operable to determine that at least one of the user and the device is authorized to be a buddy.

5. One or more computer-readable non-transitory storage media embodying software that is operable when executed to:
receive a virtual private network (VPN) establishment request communicated over at least one first protocol, and also receive a plurality of packets not associated with the VPN establishment request,
the at least one first protocol being at least one of the Session Initiation Protocol, the Open System for Communication in Realtime protocol, and the Extended Messaging and Presence Protocol;
communicate a confirmation packet indicating that the VPN establishment request is authorized,
wherein the confirmation packet is prioritized to have a higher priority than the priority of the plurality of packets by distinguishing the confirmation packet from the plurality of packets,
the distinguishing including examining a type field of the confirmation packet,
the confirmation packet also including a negotiation packet using the at least one first protocol, the negotiation packet comprising:
a destination port; and
a response port; and
communicate, over a second communication protocol, a datagram through a communication tunnel established in response to receiving the negotiation packet, wherein:
the datagram is associated with a payload type;
the datagram comprises an encapsulation envelope that indicates the payload type;
the datagram is received at the destination port;
a response to the datagram is communicated to the response port; and
the second communication protocol is different from the at least one first protocol.

6. The media of claim 5 embodying software that is further operable when executed to communicate a buddy request.

7. The media of claim 5 embodying software that is further operable when executed to present, on a display, a list of buddies comprising an indicator associated with a device capable of establishing a VPN.

8. The media of claim 5 embodying software that is further operable when executed to present, on a display, a presence status associated with a device capable of establishing a VPN.

9. A method comprising:
receiving a virtual private network (VPN) establishment request communicated over at least one first protocol, and also receiving a plurality of packets not associated with the VPN establishment request,
the at least one first protocol being at least one of the Session Initiation Protocol, the Open System for Communication in Realtime protocol, and the Extended Messaging and Presence Protocol;
communicating a confirmation packet indicating that the VPN establishment request is authorized,
wherein the confirmation packet is prioritized to have a higher priority than the priority of the plurality of packets by distinguishing the confirmation packet from the plurality of packets,
the distinguishing including examining a type field of the confirmation packet,
the confirmation packet also including a negotiation packet using the at least one first protocol, the negotiation packet comprising:
a destination port; and
a response port; and
communicating, over a second communication protocol, a datagram through a communication tunnel established in response to receiving the negotiation packet, wherein:
the datagram is associated with a payload type;
the datagram comprises an encapsulation envelope that indicates the payload type;
the datagram is received at the destination port;
a response to the datagram is communicated to the response port; and
the second communication protocol is different from the at least one first protocol.

10. The method of claim 9 further comprising communicating a buddy request.

11. The method of claim 9 further comprising presenting, on a display, a list of buddies comprising an indicator associated with a device capable of establishing a VPN.

12. The method of claim 9 further comprising presenting, on a display, a presence status associated with a device capable of establishing a VPN.

* * * * *